(No Model.)
E. B. COXE, Dec'd.
A. B. & H. B. COXE, Executors.
TRAVELING GRATE.
No. 562,069. Fig. 1. Patented June 16, 1896.
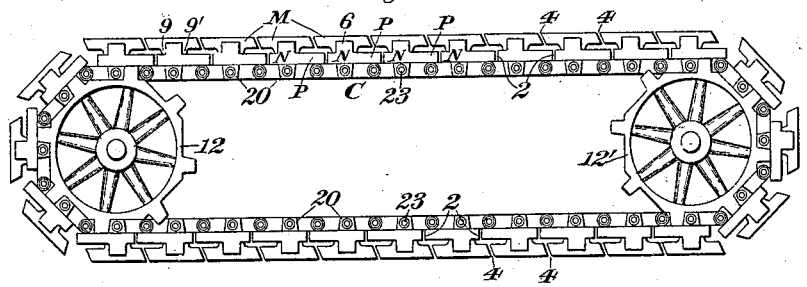
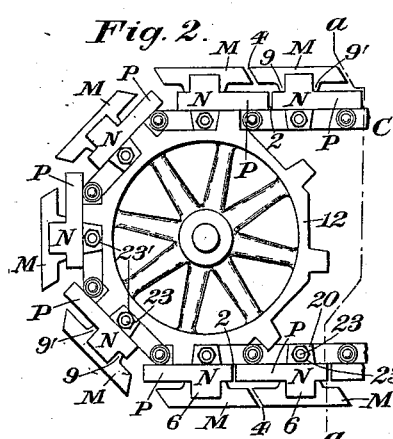
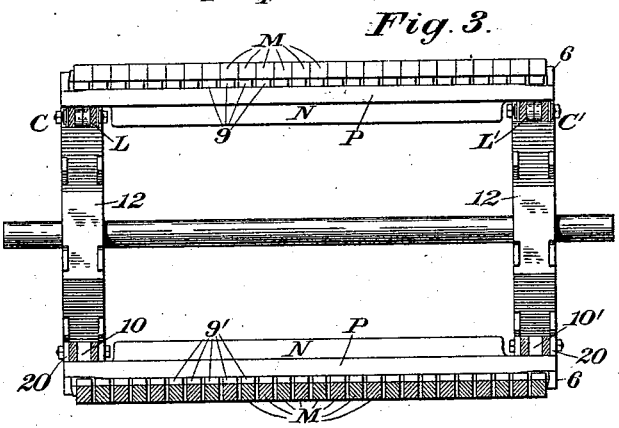
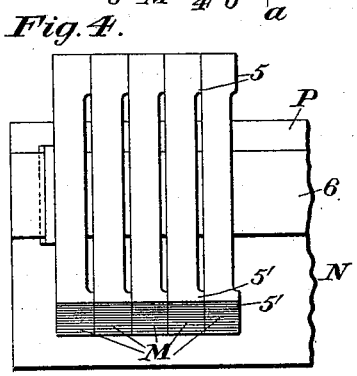
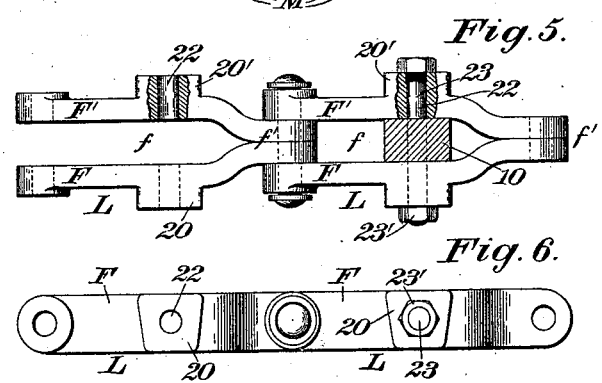
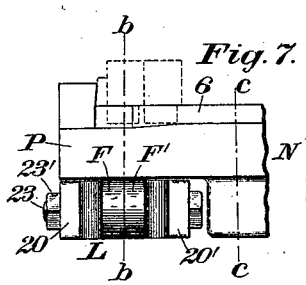
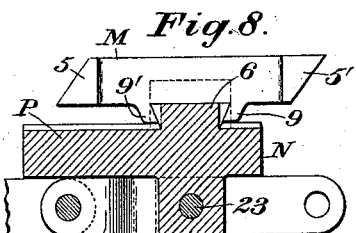
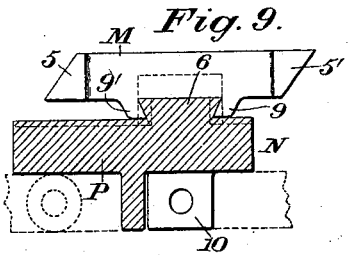
Witnesses:
J. L. Edwards Jr.
Fred. J. Dole.
Alexander B. Coxe,
Henry B. Coxe.
} Executors of Estate of
Eckley B. Coxe, Inventor, deceased.
By their Attorney,
F. H. Richards.

UNITED STATES PATENT OFFICE.

ALEXANDER B. COXE, OF DRIFTON, PENNSYLVANIA, AND HENRY B. COXE, OF NEW YORK, N. Y., EXECUTORS OF ECKLEY B. COXE, DECEASED.

TRAVELING GRATE.

SPECIFICATION forming part of Letters Patent No. 562,069, dated June 16, 1896.

Application filed January 21, 1896. Serial No. 576,351. (No model.)

*To all whom it may concern:*

Be it known that ECKLEY B. COXE, deceased, late a citizen of the United States, residing in Drifton, in the county of Luzerne and State of Pennsylvania, invented certain new and useful Improvements in Furnace-Floors for Traveling-Grate Furnaces, of which the following is a specification.

This invention relates to traveling furnace-floors or endless-chain grates such as are described in Letters Patent of the United States No. 535,402, dated March 12, 1895, and as also described in Letters Patent of the United States Nos. 515,656 and 515,657, both dated February 27, 1894, the furnace-floor constituting the subject-matter of the present invention being to a certain extent in the nature of an improvement upon the furnace-floors or traveling grates described in the aforesaid Letters Patent.

The present invention more particularly resides in certain improvements in the construction and organization of the constituent elements of the supporting-chains or drive-chains and the chain-carrying wheels, and in certain improvements in the relative organization of the several parts of the furnace-floor.

One object of the present invention is to furnish a furnace-floor or endless-chain grate especially adapted for use in connection with the class of traveling-grate furnace described in Letters Patent of the United States No. 499,716, dated June 20, 1893, and to so construct and organize the same that the parts thereof may be quickly disassembled and reassembled to facilitate the removal and replacement of parts in case of breakage or injurious wear, and also to facilitate the general repairing of the furnace-floor or any part thereof.

A further object of the invention is to furnish a furnace-floor of the class specified, embodying an improved drive-chain especially adapted for supporting and carrying the floor-beams or grate-bar-supporting beams, and which chain comprises a series of substantially duplicate links pivotally connected together at adjacent ends, and each link having one bifurcated end which straddles the non-bifurcated end of the next adjacent preceding link, and each link having an opposite non-bifurcated end which is straddled by the bifurcated end of the next adjacent succeeding link, and which links are so constructed and relatively organized as to provide a space between the side walls and the pivotal points of each link for the reception of the attaching-flange of a floor-beam, and each link of which chain has, on opposite side faces and approximately midway between the pivoted ends thereof, oppositely-disposed laterally-projecting lugs adapted to be engaged by the teeth of the sprocket-wheel which carries the chain, all of which will be hereinafter more fully described.

In the drawings accompanying and forming part of this specification, Figure 1 is a side elevation of a traveling-furnace-floor mechanism embodying the present improvements. Fig. 2 is a view, similar to Fig. 1, of a portion of one end of the furnace-floor drawn upon an enlarged scale. Fig. 3 is a vertical cross-section of the furnace-floor, taken in dotted line *a a*, Fig. 2, looking toward the left hand in said figure. Fig. 4 is a plan view of a portion of one of the floor-beams of the furnace-floor, together with some of the grate-bars supported thereon. Fig. 5 is a plan view of two connecting-links of the floor-beam-carrying chain or drive-chain, showing a portion of the attaching-flange of one of the floor-beams in cross-section. Fig. 6 is a side view of that portion of the drive-chain shown in Fig. 5. Fig. 7 is an end view of one of the links of the drive-chain seen from the right hand in Fig. 5 and showing a portion of one end of a grate-bar-supporting beam, two grate-bars being shown in dotted lines on said beam. Fig. 8 is a cross-sectional view of the parts of the furnace-floor shown in Fig. 7, said section being taken in dotted line *b b*, Fig. 7, and looking toward the left hand in said figure and showing a grate-bar in side elevation; and Fig. 9 is cross-sectional view similar to that of Fig. 8 and taken in dotted line *c c*, Fig. 7, looking toward the left hand in said figure, the chain-links being shown in dotted line.

Similar characters of reference designate like parts in all the figures of the drawings.

In the drawings only so much of a traveling furnace-floor is shown as is deemed necessary to an understanding of the construction, organization, and mode of operation thereof.

The furnace-floor constituting the subject-matter of the present invention will preferably be of the "endless-grate" type and will run upon chain-wheels located one set at each end of the circuit, or at each end of the horizontal runs thereof, as shown most clearly in Figs. 1 and 3.

As in the aforesaid Letters Patent No. 535,402 the traveling furnace-floor or endless-chain grate is shown comprising a series of successive floor-beams or grate-bar-supporting beams N, carried by the endless chains C and C', running over and driven by chain-wheels 12 and 12', located at opposite ends of the horizontal portion of the circuit, respectively, and a series of grate-bars or floor-plates M, removably carried by each floor-beam, all of which will be hereinafter more fully described.

Each floor-beam is carried at opposite ends thereof by links L and L' of the endless chains C and C', respectively, and these links, together with the floor-beam N, supported on said links and the floor-plates M, supported on said floor-beam, constitute one of the successive sections comprising the traveling furnace-floor, and these parts may be hereinafter referred to collectively as a "floor-section."

The floor-beams N and grate-bars M of the successive floor-sections are shown, in their construction and relative organization, in a general way, similar to the floor-beams and grate-bars described in the aforesaid Letters Patent No. 535,402, to which patent reference may be had for a more complete description of the construction and relative organization of said floor-beams and grate-bars. It will be understood, however, that the construction and relative organization of the said floor-beams and grate-bars may, without departure from the present invention, be variously modified.

Each floor-beam N of the successive floor-sections comprises, in the form thereof herein shown, a lower floor-plate P, which is supported at opposite ends thereof upon the upper faces of the two opposite links L and L' of the two chains C and C', respectively, each lower floor-plate having upon the upper face and extending from end to end thereof a grate-bar-supporting flange or rib 6, which is preferably dovetailed cross-sectionally, and is located near one of the side edges of the lower floor-plate. This lower floor-plate also has upon the under side thereof a longitudinal strengthening flange or rib, which terminates at its opposite ends remote from the extreme outer ends of the lower floor-plate, and said lower floor-plate also has at opposite ends thereof two depending transversely-disposed attaching-flanges 10 and 10', respectively, by means of which the opposite ends of the floor-beam are secured to the said links L and L', respectively.

The upper floor-plates or grate-bars M, which are shown of substantially the same construction and organization as the floor-plates or grate-bars in the Patent No. 535,402, as before stated, are removably supported upon the upper flanges 6 of the lower floor-plates or floor-beams, and are held as against displacement by means of oppositely-disposed relatively-convergent attaching flanges or lips 9 and 9' upon the under side of said grate-bars, the grate-bars of the series of grate-bars of each floor-beam being slightly separated from one another in a transverse direction to form air-spaces between grate-bars by means of air-space-formative projections 5 and 5', located on one side and at opposite ends, respectively, of each grate-bar.

In practice the successive floor-beams are so disposed relatively to one another that narrow air-spaces 2 are formed between the side faces of adjacent lower floor-plates thereof, and the upper floor-plates or grate-bars of the floor-beam are so disposed relatively to those of the next adjacent floor-beam that an air-space 4 is formed between the upper floor-plate or grate-bar of one floor-beam and those of the next adjacent floor-beam, and the upper floor-plates or grate-bars of one floor-beam are so disposed as to extend over and cover the air-space between the lower floor-plate of this beam and the lower floor-plate of the next adjacent preceding floor-beam, as will be readily understood by reference to Figs. 1 and 2 of the drawings.

In furnace-floors or endless-chain grates of the class specified it has heretofore been customary to so construct and organize the drive-chains and chain-wheels that the teeth of the chain-wheels would engage the floor-beam-carrying link of the chain at the extreme end of said link and at one side of each lower floor-plate and between this lower floor-plate and the next adjacent lower floor-plate, as will be understood by reference to the Patent No. 535,402, hereinbefore referred to.

In practice it has been ascertained that where the teeth of the chain-wheels engage the successive beam-carrying links of the chain at the extreme ends of said links and at one side of the longitudinal axes of the lower floor-plates of said beams said teeth have a tendency to tilt the links upward as these come into position and are engaged by the teeth of the chain-wheels, and in consequence thereof the traction of the wheels is occasionally impaired more or less and the upper run of the grate is thrown out of true alinement relatively to its normal horizontal plane.

In accordance with the preferred embodiment of the present invention herein shown and described each floor-beam-supporting chain comprises a series of substantially duplicate beam-supporting links, which are pivotally connected to one another at adjacent ends thereof, and each link has a bifurcated end $f$ and a non-bifurcated end $f'$, the bifurcated end of which straddles the non-bifurcated end of the adjacent preceding link and the non-bifurcated end of which is straddled by the bifurcated end of the next adjacent succeeding link, or vice versa, according to the direction of circuitous movement of the grate, and each link of which has, substantially midway of its length, two oppositely-disposed laterally-projecting lugs 20 and 20', located, respectively, on opposite side faces of said link. Each link is shown comprising two longitudinally-separated members, (designated in a general way by F and F',) which members have their inner faces at one end in contact, as shown at $f'$, and are separated at their opposite ends $f$ by a space-distance equal to the thickness of the attaching-flange of the floor-beam carried on this link; but it will be obvious that the links of the drive-chain may each be made in one piece without departure from this invention. These lugs 20 and 20', which are shown somewhat in the nature of teeth and of polygonal form, will preferably have plane side faces complementary to the plane lug-engaging faces of the teeth of the sprocket or drive wheel. Formed transversely through the middle portion of each link, and consequently central with relation to the lugs 20 and 21, is a bolt-receiving opening 22, through which the bolt 23, which secures the floor-beam relatively to said links, extends.

In the preferred form thereof each floor-beam has, at opposite ends thereof, as before stated, transversely-disposed depending attaching-flanges 10 and 10', respectively, which flanges have transverse bolt-receiving openings 24 therethrough for the reception of the bolts 23, which extend through said flanges and through the links which carry the floor-beam and secure the floor-beam in place upon said links. These attaching-flanges are so located relatively to the grate-bar-supporting rib 6 of the floor-beam that the longitudinal axes of the floor-beam and the bolt-openings of the flanges are in parallelism and in the same plane, one being located directly above the other, and said flanges are of a thickness substantially equal to the distance between the inner faces of the two members of a link, and will be readily understood by reference to Figs. 1, 2, 5, 6, and 9 of the drawings.

In assembling the grate-beams relatively to their carrying-chains each grate-beam is placed at opposite ends upon two opposite links L and L' of the two chains C and C', so that the transverse flanges 10 and 10' are seated between the opposite members of both links, as shown in Fig. 3, with their bolt-openings in register with the bolt-opening 22 of said link, after which the bolts 23 are extended through the links and flanges and the nuts 23' are screwed thereon to firmly secure the parts together.

By the construction and arrangement of floor-beams and floor-beam-carrying chains, as herein described, the bolts which secure the floor-beams to the links of the chain are located substantially midway of the length of the grate-bars supported upon said beams, and each bolt is in axial parallelism with the longitudinal axis of rib or flange 6 of the beam through the attaching-flange of which said bolt is extended, and that portion of the link through which said bolt extends is reinforced and strengthened by the lugs 20 and 20'. This brings the greatest weight of the floor-beam substantially central between the opposite ends of the links which carry said floor-beam and secures a balancing of said parts, which is highly conducive to the uniform movement of the furnace-floor during the operation thereof.

The chain-wheels, which are somewhat similar in a general way to the chain-wheels shown in the Letters Patent No. 535,402 hereinbefore referred to, each have two sets of peripherally-disposed teeth, the teeth of one set of which are located at one side of the center of the rim of the wheel and are adapted for engaging the lugs 10 upon one side of the chain-links, and the teeth of the other set of which are located at the opposite side of the center of the rim of the wheel and are adapted for engaging the lugs 10' upon the opposite sides of the links of said chain.

Owing to the construction and organization of the several parts of the furnace-floor the teeth of the chain-wheels engage the links at opposite sides thereof and approximately midway between the opposite ends of the lower floor-plates of the floor-beam, and consequently have no tendency to tip said floor-beam upward or rock them on their longitudinal axes, which are matters of considerable importance in furnace-floors of this class, as it prevents cramping or buckling of the parts and obviates the waste of power from actuating said floor.

Having thus described the invention of ECKLEY B. COXE, what we claim as new, and desire to secure by Letters Patent, is—

1. In a drive or sprocket chain, two duplicate links pivotally connected together at their adjacent ends with their side faces in alinement, and each link having one or more outwardly-extending lugs located approximately midway between the extreme ends of said link, and each link also having, substantially midway of its width, a flange-receiving opening.

2. In a drive-chain, a series of similarly-disposed bifurcated links pivotally connected together at adjacent ends, and each link comprising two oppositely-disposed link members having the inner faces of one end thereof in bearing contact and having the inner faces of the opposite ends thereof separated, and each link member having upon the outside face, approximately midway between the extreme ends thereof, an outwardly-extended tooth or lug.

3. A drive-chain link comprising two link members having the inner faces of one end in bearing contact and having the inner faces of the opposite end relatively remote and in parallelism, and each member having upon the outside face, approximately midway between the extreme ends thereof, a tooth-like lug, and each member also having a transverse bolt-receiving opening which extends through said lug.

4. The herein-described drive-chain for furnace-floors of the class specified, it consisting of a series of substantially duplicate links pivotally connected together at adjacent ends; and each of which links has one bifurcated end which straddles the non-bifurcated end of the next adjacent preceding link, and has a non-bifurcated end which is straddled by the bifurcated end of the next adjacent succeeding link; and each link of which also has two lugs which are formed integral with, and project outward from opposite outside faces, respectively of, said links.

5. The herein-described drive-chain for furnaces of the class specified, it consisting of a series of substantially duplicate links pivotally connected together at adjacent ends; and each of which links has a bifurcated end which straddles the non-bifurcated end of the next adjacent preceding link, and has a non-bifurcated end which is straddled by the bifurcated end of the next adjacent succeeding link, or vice versa; and each of which links has also two oppositely-disposed laterally-projecting lugs, one integral with each outside face of said link, and located substantially midway between the pivoted ends of said link.

6. The herein-described drive-chain for furnace-floors of the class specified, it consisting of a series of substantially duplicate links pivotally connected together at adjacent ends; and each of which links has a bifurcated end which straddles the non-bifurcated end of the next adjacent preceding link, and has a non-bifurcated end which is straddled by the bifurcated end of the next adjacent succeeding link, or vice versa; and each of which links has two polygonal lugs which extend outward from the opposite outside faces, respectively, of the link at a point substantially midway between the pivoted ends of said link.

7. In a drive-chain of the class specified, a bifurcated link having two lugs which are formed integral with, and extend outward from opposite outside faces, and at right angles to the longitudinal plane of, said link, and approximately midway between the opposite ends thereof.

8. In a drive-chain of the class specified, a bifurcated link having transverse pivot-holes in opposite ends thereof, having, approximately midway between opposite ends of said link, two transversely-perforated axially-allied lugs which are formed integral with, and extend outward from opposite outside faces of, said link.

9. In a traveling furnace-floor, two endless chains comprising a series of substantially duplicate bifurcated links pivotally connected together at adjacent ends thereof; and each link having two transversely-perforated lugs which extend outward from opposite outside faces, respectively thereof, and at a point substantially midway between the pivoted ends of said link; in combination with a series of floor-beams, each of which has two depending perforated flanges at opposite ends, respectively thereof; and which flanges are seated between the perforated lugs of the two opposite links of the two adjacent chains; pins extending through said flanges and adjoining lugs; and chain-driving sprocket-wheels, each having two remotely-disposed circuits or teeth in position for engaging the opposing lugs of the several links.

ALEXR. B. COXE,
HENRY B. COXE,
*Executors of the estate of Eckley B. Coxe, deceased.*

Witnesses:
FRANCIS H. RICHARDS,
W. ALEX. ROBINSON.